United States Patent
Von Löwis of Menar

[11] 3,897,845
[45] Aug. 5, 1975

[54] POWER STEERING SYSTEM
[75] Inventor: Alexander Von Löwis of Menar, Mauren, Germany
[73] Assignee: Robert Bosch G.m.b.H., Stuttgart, Germany
[22] Filed: Mar. 20, 1974
[21] Appl. No.: 453,026

[30] Foreign Application Priority Data
Apr. 10, 1973 Germany .......... 2317836
May 26, 1973 Germany .......... 2327006

[52] U.S. Cl. .................. 180/148; 74/498
[51] Int. Cl. .................. B62d 5/06
[58] Field of Search ........ 180/79.2 R, 79.2 F; 74/388 PS, 498

[56] References Cited
UNITED STATES PATENTS
3,347,109  10/1967  Adams et al. ........ 180/79.2 F
3,352,170  11/1967  Adams ................ 180/79.2 F

FOREIGN PATENTS OR APPLICATIONS
535,506   2/1955  Belgium ............ 180/79.2 F
808,373   2/1959  United Kingdom .... 180/79.2 F
813,312   5/1959  United Kingdom .... 180/79.2 F Primary Examiner—Kenneth H. Betts
Assistant Examiner—John A. Pekar
Attorney, Agent, or Firm—Edwin E. Greigg

[57] ABSTRACT

A hydraulic power steering system (power-assisted steering), especially useful for motor vehicles, includes a rack rod which can be moved by a pinion. The pinion is disposed on a steering shaft. A hydraulic pressure medium storage container is supplied by a source of pressure medium. The storage container supplies the pressure medium to a servomotor, embodied as a double-acting hydraulic piston. The servomotor acts on the rack rod in the sense of assisting the steering motion. A control valve assembly controls the supply of the pressure medium to the servomotor, the control valve assembly being actuatable by a transmitting device for transmitting the rotational motion and direction of the steering shaft. The device includes a lever, which is pivoted between two limiting members about a fixed axis of rotation, in the direction of the rack rod. The lever carries an end of the steering shaft which includes the pinion. The lever is also connected to the valve assembly.

8 Claims, 8 Drawing Figures

POWER STEERING SYSTEM

BACKGROUND OF THE INVENTION

This invention relates to a power steering system (power assisted steering) which is especially suitable for motor vehicles. The invention is, more particularly, related to a power steering system which includes a control valve assembly actuatable by a device which transmits the rotational motion and rotational direction of the steering shaft of a motor vehicle.

The invention concerns a hydraulic power-steering apparatus especially for motor vehicles, with a rack rod, movable by a pinion disposed on a steering shaft. A hydraulic pressure medium storage container, supplied by a source of the pressure medium, is provided for supplying the pressure medium to a servomotor which acts on the rack rod in the sense of assisting the steering motion. The supply of pressure medium to the servomotor is controlled by a control valve assembly (installation) actuated by a device for transmitting the rotational motion and rotational direction of the steering shaft.

In a known apparatus for power steering of the relevant type, the steering shaft is made in two parts. The two parts are connected by a torsion rod. Thus, the two parts of the shaft are rotatable, to an extent, with respect to one another, so that two control valves, disposed laterally to and non-centrally with respect to the longitudinal axis in one part of the shaft, can be actuated by actuation arms at the other end of the shaft during torsion. In this way, the pressure medium is supplied to the servomotor which augments the steering motion. When the steering wheel turns about the longitudinal axis of the steering shaft, the control valve assembly rotates with it, so that the communication of the pressure medium fittings located between the control valve assembly and the pressure fittings that are fixed to a housing can be achieved by annular grooves which must be sealed with respect to one another by shaft seals.

This arrangement has the disadvantage that an expensive and very vulnerable seal is required in the control valve assembly which rotates together with the steering shaft. Furthermore, the spatial requirement of such an assembly, in which the entire control system for controlling a servomotor lies between the rack rod and the steering wheel, is still relatively large. Especially if, for example, for safety reasons, the steering column is disposed at an angle by the use of a universal joint, and if the end of the steering shaft is intended to lie behind the front axle, then it becomes important that such a control system requires only a relatively small space.

SUMMARY OF THE INVENTION

It is an object of the present invention to provide a hydraulic power steering system which uses rack and pinion steering and requires as small a space as possible in the direction of the steering shaft.

It is another object of the present invention to provide a hydraulic power steering system which does not require shaft seals loaded in the direction of rotation for the purpose of creating trouble-free pressure medium connections to its control valve assembly.

The foregoing objects, as well as others which are to become clear from the text below, are accomplished in accordance with the present invention in a hydraulic power steering system, especially suitable for motor vehicles, which has a rack rod, movable by a pinion disposed on a steering shaft. A hydraulic pressure medium storage container, supplied with a pressure medium, is provided. The storage container supplies the pressure medium to a servomotor, embodied as a double-acting hydraulic piston. The servomotor acts on the rack rod in the sense of assisting the steering motion. A control valve assembly controls the supply of the pressure medium to the servomotor, the control valve assembly being actuatable by a transmitting device for transmitting the rotational motion and direction of the steering shaft. The transmitting device includes a lever which is provided between two limiting members (stops) about a fixed axis of rotation in the direction of the rack rod. The lever carries an end of the steering shaft which includes the pinion. The lever is connected to the control valve assembly.

A salient feature of the present invention is that a lever, pivotable between two limiting members, can move about a fixed axis of rotation, in the direction of motion of the rack rod. This lever carries that end of the steering shaft with the pinion, the lever being also connected to the control valve assembly. This has the advantage that the control valve assembly can be installed fixed to the housing, and does not require additional space in the direction of the steering shaft. The control valve assembly, according to one embodiment of the invention, is installed in a fixed housing. Consequently, the arrangement does not require seals between mutually rotating parts for creating the communications of the pressure fitting connections. The most widely different embodiments of known valve installations can be used.

In a further embodiment according to the present invention, the lever and the steering shaft end with the pinion are disposed in a common steering housing containing also the control valve assembly, through which the rack rod is guided.

This has the advantage of a compact construction, and, furthermore, the displacement of the pinion usable for control can be transmitted directly by the lever with the attendant elimination of negative influences caused by deformation of the steering shaft or by torsion of the steering shaft and the steering housing, with respect to one another. Moreover, in an advantageous further embodiment of the invention the steering shaft end is mounted on the lever both radially and axially, and exits from the steering housing without guidance at a penetration location. At this location, the steering shaft is sealed with respect to the steering housing in the radial direction by a resilient shaft seal. In this way, the pinion can yield in the direction of the longitudinal axis of the rack rod without impediment. At the same time, however, sealing of the steering housing (box) is achieved. The steering shaft is positively fixed in the axial direction and, because of its elastic bearing or the customarily interposed universal joints, it absorbs the small excursional motions of the pinion because of its free, lateral mobility.

In a further advantageous embodiment of the present invention, the steering shaft is axially and radially carried in bearings at the entrance into the steering housing, and is connected to the steering shaft end carrying the pinion and radially borne in the lever by means of a coupling member and two universal joints.

In advantageous manner, in this disposition, the steering shaft is exactly guided by fixed bearings with respect to both the radial and the axial directions. The yielding motions of the pinion are made possible by the intermediate coupling member having the two universal joints. Furthermore, only radial bearings are necessary for bearing that part of the shaft carrying the pinion, because axial loading no longer occurs. In turn, this has a favorable effect on the space requirements in the radial direction toward the steering shaft. The coupling member advantageously can be made very short because of the mixture excursion of the pinion, and thus only a very small supplementary space is required in the direction of the steering shaft. In yet another embodiment according to the present invention, the rotational axis is defined by a member displaceable in the sense of pressing the pinion onto the rack rod, by the force of a spring. This simple and space-saving disposition achieves an equalization of play between the pinion and the rack rod without an excursion of the rack rod. This is especially advantageous when the rack rod and the piston rod of the servomotor are constituted by the same piece, because no expensive movable seal is required and wear is reduced. In an additional advantageous embodiment of the present invention, the rotational axis is defined by a member loaded by a pressure spring perpendicular with respect to the pinion axis and to the rack rod. Movement against the pressure spring is possible up to an adjustable stop. This has the advantage that, in a simple way, the maximum permissible play between the pinion and the rack rod is adjustable.

In yet a further advantageous embodiment of the present invention, the rotational axis is defined by a member carried on a rocker beam pivotable about a fixed axis parallel to the rotational axis. In this way, the dimensions of the steering housing perpendicular to the rack rod can advantageously be made very small, and an exact guidance of the member defining the rotational axis can be achieved.

In still another advantageous embodiment of the present invention, the rotating axis is defined by a rack bar located on a member guided in the steering housing and movable up to a stop against the force of a pressure spring. The rack bar engages a corresponding longitudinal groove of the lever. In this way, a particular advantageous embodiment is provided which is favorable both with respect to dimensions and wear.

Furthermore, it is advantageous that the rack and the longitudinal groove contain respective oppositely lying blind holes for receiving a coupling member which is to absorb lateral forces, the coupling member being advantageously a sphere.

DETAILED DESCRIPTION OF THE PREFERRED EMBODIMENTS

Figure 1:
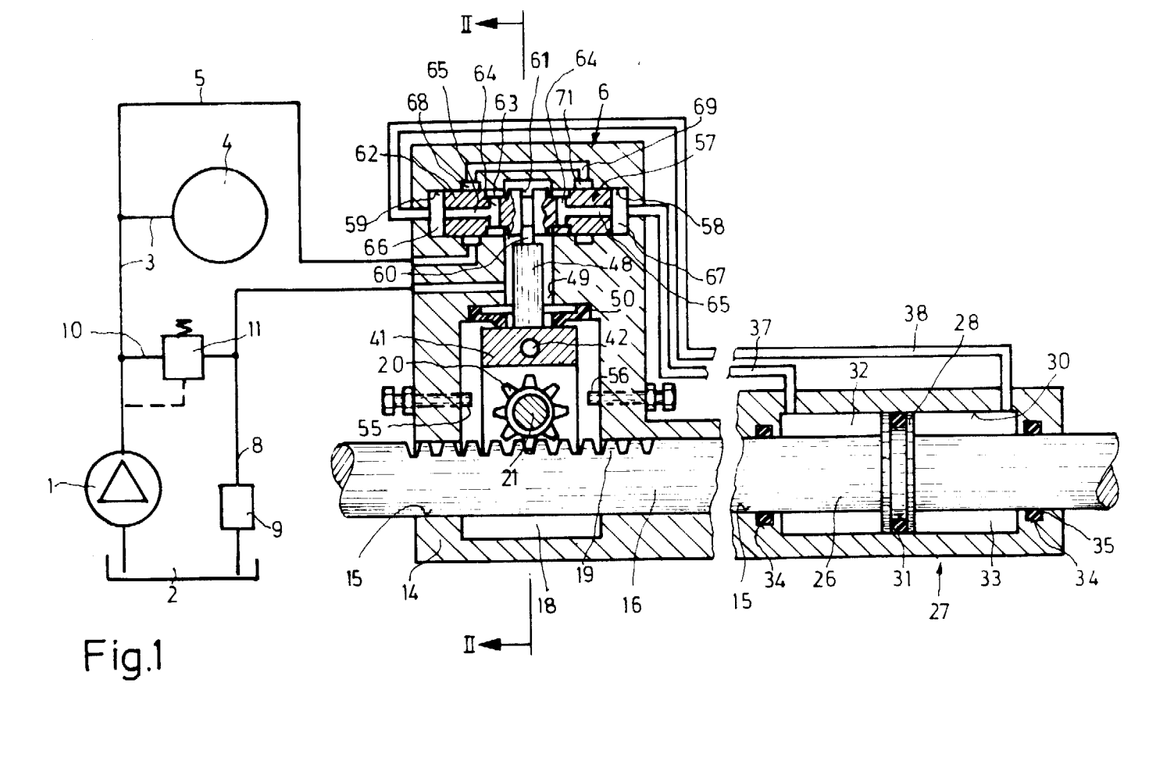
FIG. 1 is a longitudinal section through a first exemplary embodiment of the hydraulic steering system according to the present invention, some elements being shown schematically.
Figure 2:
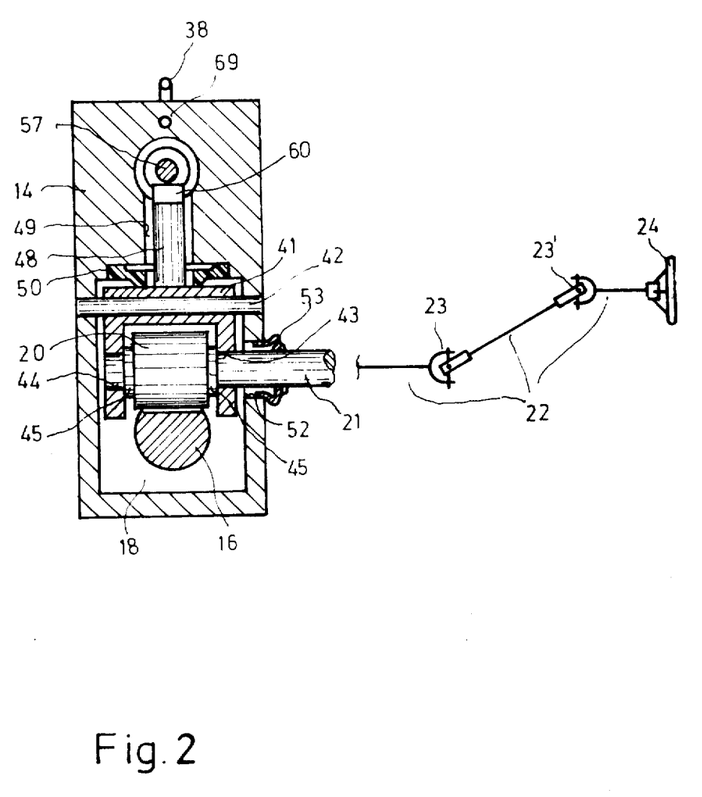
FIG. 2 is a sectional view of the exemplary embodiment of FIG. 1, the section being taken along the line II—II.

As shown in FIGS. 1 and 2, the first exemplary embodiment of a hydraulic steering system includes a pump 1 for transporting a pressure medium from a storage container 2, the pressure medium being supplied through a line 3 connected to a pressurized storage container 4. Branching off from the line 3 and from the pressurized storage container 4 is a line 5 leading to a control valve assembly (installation) 6. The return from the control valve assembly 6 occurs through a line 8 and an intermediately disposed pressure medium filter to the storage container 2. Between the return line 8 and the line 3 there is a connecting line 10, which has a built-in pressure limiting valve 11.

A rack rod 16, which is connected with a steering gear of a motor vehicle (not shown) is guided in a longitudinal bore 15 of a steering housing box 14. The part of the rack rod 16 lying in an interior region 18 of the steering housing box 14 is equipped with teeth 19 which are engaged by a pinion 20. The pinion 20 is rigidly attached on an end 21 of a steering shaft 22 extending into the interior volume 18. For the elimination of play, the steering shaft 22 is equipped with a universal joint 23 or, in most cases, with two universal joints 23, 23' for the safety of the operator in the vehicle during accidents. The steering shaft 22 is actuated by a steering wheel 24.

When the motor vehicle is equipped with a power steering system, one end of the rack rod 16, not equipped with gear teeth, serves as a piston rod 26 of a servomotor 27. An annular member serving as a piston 28 is affixed to the piston rod 26 and is slidable in a cylinder 30 together with the piston rod 26. The piston 28 is equipped with a radial seal 31 and consequently separates the cylinder 30 into two working chambers 32 and 33. These working chambers 32 and 33 are tightly sealed at the outlet of the piston rod 26 through the bore 15 by means of sealing elements 35 inserted in annular grooves 34. The far ends of the cylinder 30 are connected to the control valve assembly 6 by a pressure medium line 37 leading from the working chamber 32 to the control valve assembly 6 and by another pressure medium line 38 leading from the working chamber 33 to the control valve assembly 6. The shaft end 21 with the pinion 20 is carried in a fork 41 which is pivotable about a fixed axis member 42 inserted in the steering housing box 14. The end of the steering shaft 21 is carried by coaxial bores 43, 44 in the ends of the fork 41 and is secured there axially by affixed collars 45.

Figures 3, 4:
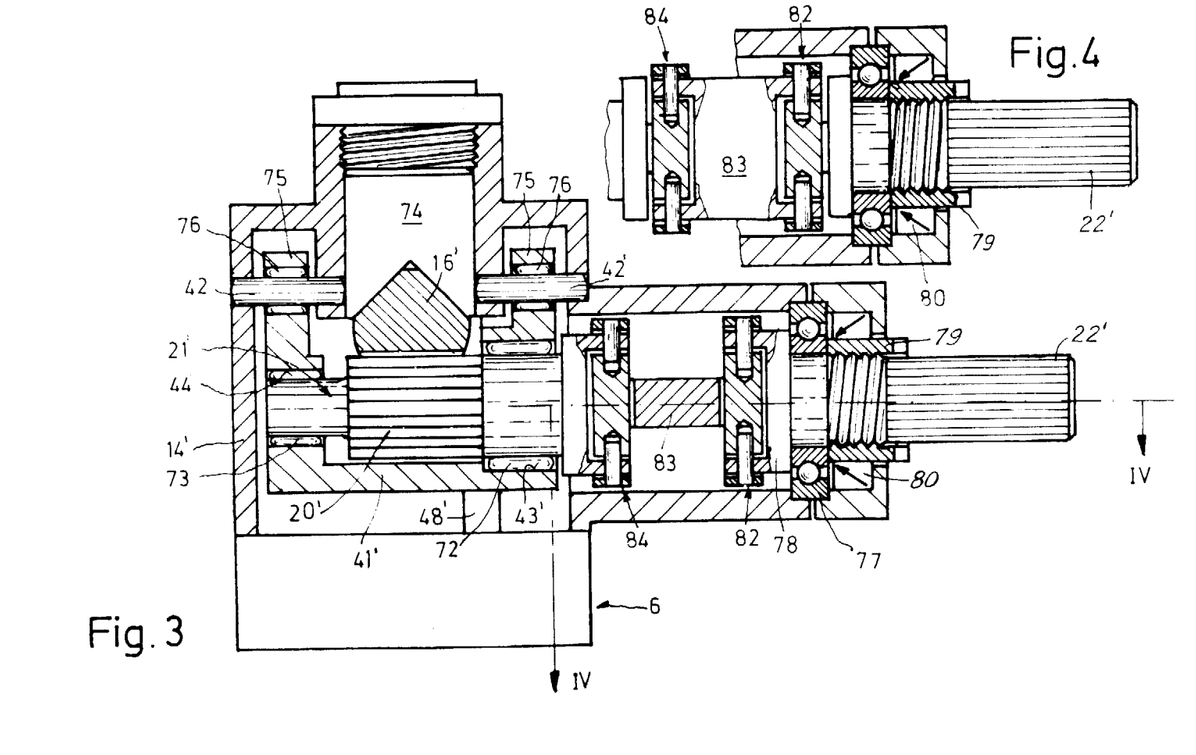
FIG. 3 is a partial section through a second exemplary embodiment of the hydraulic power steering system according to the present invention.
FIG. 4 is a partial section through the exemplary embodiment of FIG. 3, the section being taken along the line IV—IV.

As is shown in the exemplary embodiment according to FIG. 3, it is advantageous, for the purpose of reducing friction, to use roller bearings for holding the fork 41 on the fixed axis member 42 and also for holding the end 21 of the steering shaft 22 in the bores 43 and 44. In this arrangement, the pinion 20 can be directly machined into the shaft end 21 and the shaft stud can be carried in the bore 44 in a ball-bearing capable of accepting axial forces.

In the region beyond the axis member 42, the fork 41 has an operating pin 48 fixedly connected thereto which extends into a cylindrical volume 49 adjacent to the interior volume 18 which serves for the actuation of the control valve assembly 6. The cylindrical space 49 is sealed with respect to the interior volume 18 of the steering housing box 14 by an elastic seal 50 contacting the top of fork 41. The shaft end 21 extends from the interior volume 18 through an aperture 52 in the steering housing box 14 and, at this location, it is equipped with a radially yielding shaft seal 53 inserted in the aperture 52 so that the interior volume 18 is tightly sealed against the outside. This yielding shaft seal 53 makes it possible for the shaft end 21 and the pinion 20 to perform small pivotal motions about the axis member 42, in the longitudinal direction of the rack rod 16. The pivotal motions are limited by adjustable stops 55 and 56, for example screws screwed into the housing box 14 so that, when the fork 41 lies up against the stops 55 and 56, a positive connection is made between the pinion 20 and the rack rod 16. The rack rod 16 can consequently be moved when the steering shaft 22 is rotated. The control valve assembly 6 includes a double-acting control valve 57 which is slidable by the operating pin 48 within two coaxial blind bores 58, 59 branching off to the left and to the right of the cylindrical volume 49. For this purpose, a stud 60 on the operating pin 48 engages an annular groove 61 of the double-acting control valve 57.

The double-acting control valve 57 is of symmetrical construction and has an annular groove 63 adjacent to each of its piston-shaped outermost ends 62. The annular groove 63 communicates through a lateral bore 64 and through longitudinal bore 65 within the double-acting control valve 57 with working chambers 67 and 66 enclosed respectively by the double-acting control valve 57 in the blind bores 58 and 59. The pressure medium line 37 terminates in the working chamber 67 and the presssure medium line 38 terminates in the working chamber 66.

When the double-acting control valve 57 is in its central position, the annular grooves 63 communicate with the cylindrical volume 49 from which the return line 8 leads to the storage container 2. Thus, a connection is formed between the working chambers 32 and 33 of the servomotor 27 and the storage container 2 through the lateral bores 64, the longitudinal bores 65 as well as the pressure medium lines. The two working chambers 32 and 33 of the servomotor 27 are pressure relieved in this way.

When the double-acting valve 57 is displaced to the left by the operating pin 48, the communication of the annular groove 63 with the cylindrical volume 49 is interrupted and a communication is created between the annular groove 63 and an annular groove 68 in the wall of the blind bore 59. The line 5 from the pressure storage container 4 terminates in the annular groove 68. The annular groove 68 is further connected by a connection line 69 to an annular groove 71 disposed symmetrically with respect to the annular groove 68 within the blind bore 58.

As soon as the connection is established between the annular groove 63 and the annular groove 68, the pressure medium can flow through the lateral bore 64, the longitudinal bore 65 and the pressure medium line 38 into the working chamber 33 of the servomotor 27. The displacement of the double-acting control valve 57 to the left is affected whenever the pinion 20 is actuated in such a way as to cause a displacement of the rack rod 16 toward the left. The resulting displacement of the double-acting control valve 57 to the left creates a pressure buildup in the working chamber 33 and this results in assisting the motion of the rack rod 16 toward the left through the servomotor 27 because the working chamber 32 is still pressure-relieved with respect to the storage container 2. When the pinion 20 has stopped turning, it is returned to its central position by the pressure in working chamber 66 acting only on one side of the double-acting control valve 57, and in that position, the working chamber 33 is pressure-relieved through the annular groove 63. In this central position, the line 5 is closed so that the removal of the pressure fluid is interrupted. In a steering motion in the opposite direction, to the right, pressure is admitted into the working chamber 32 of servomotor 27, and the steering motion in the right-hand direction is assisted. If no pressure medium is available, for example, when the servomotor 27 is standing still or when the pump 1 is shut off, then the pinion 20, together with the fork 41 is pivoted, depending on the direction of motion, up until the fork 41 stops at the stops 55 or 56, after which a positive connection is created between the pinion 20 and the rack rod 16. When the pinion 20 is now rotated, the rack rod 16 can be moved in the proper rotational direction. The amount of the displacement of the pinion 20 from its central position is made as small as possible in order to keep the lost motion to a minimum when the servo installation has failed.

The second exemplary embodiment, shown in FIGS. 3 and 4, is essentially constructed very similarly to that of FIGS. 1 and 2. In the embodiment of FIGS. 3 and 4, a pinion 20' is machined into the end of the steering shaft 21'. The pinion 20' has the same diameter as the adjacent portion of a steering shaft 22' which is carried in a needle bearing 72 in a bore 43' of a fork 41'. The portion of the steering shaft end 21' which aboards at the opposite side to pinion 20' is designed as a stud and is also carried in a needle bearing 73 within a bore 44'. As best seen in FIG. 3, ends 75 of the fork 41' are carried in a needle bearing 76 on an axis member 42' fixedly inserted in a steering housing box 14'. In the same manner as in the embodiment of FIGS. 1 and 2, the head of the fork 41' is continued into an operating pin 48 associated with the control valve assembly 6.

Thus, in this second embodiment, the rack rod is located between the rotational axis of fork 41' and pinion 20'. In this exemplary embodiment, the rack rod 16' is further guided in a prism-shaped guide block 74, this being necessary especially when the pinion 20' has helical gear teeth. The steering shaft 22' is carried at its entry point into the steering housing box 14' in a ball bearing 77 which is also suitable to accommodate, for example, axial forces. The ball bearing 77 adjoins a fork-shaped head 78 extending into the interior of the steering housing box 14' and it is fixed there by a threaded member 79 which is screwed onto the steering shaft 22' from the outside. A cover 81 equipped with a shaft seal 80 holds the ball bearing 77 in the steering housing box 14'.

The fork-shaped head 78 is a part of a universal joint 82 which connects to a coupling member 83 and a further universal joint 84 and to the steering shaft end 21'. The longitudinal forces occurring at the pinion 20', when it has helical gear teeth, can thus be transmitted to the ball bearing 77 through the universal joints 82, 84, and through the coupling member 83 and the pinion 20' can be pivoted along the longitudinal axis of the rack rod 16' without interference.

An arrangement of the kind discussed above is especially advantageous when short steering shafts are used and in installations having steering shaft bearings which are subject to torsion which could cause the pinion to be pivoted in erratic fashion.

The pivotal motions of the pinion 20' have been held very small so as to make the lost motion as small as possible when the servomotor is shut off. That being the case, the coupling member 83 can be made very short so that in this second embodiment, the spatial requirement in the direction of the steering shaft 22' is not much greater than that of the first embodiment constructed as shown in FIGS. 1 and 2. For this purpose, the bearing of the steering shaft end 21' was simplified, particularly since a space-requiring ball bearing in the fork 41' is no longer necessary for axial securing. As can be seen in the partial section shown in FIG. 4, the coupling member 83 is rotated by 90°.

The above-described embodiments result in a simply acting mechanism for the transmission of steering motions and the steering direction to the control valve assembly 6, wherein the control valve assembly 6 can be mounted within a fixed housing box without the necessity for rotating seals subject to wear.

Figure 5:
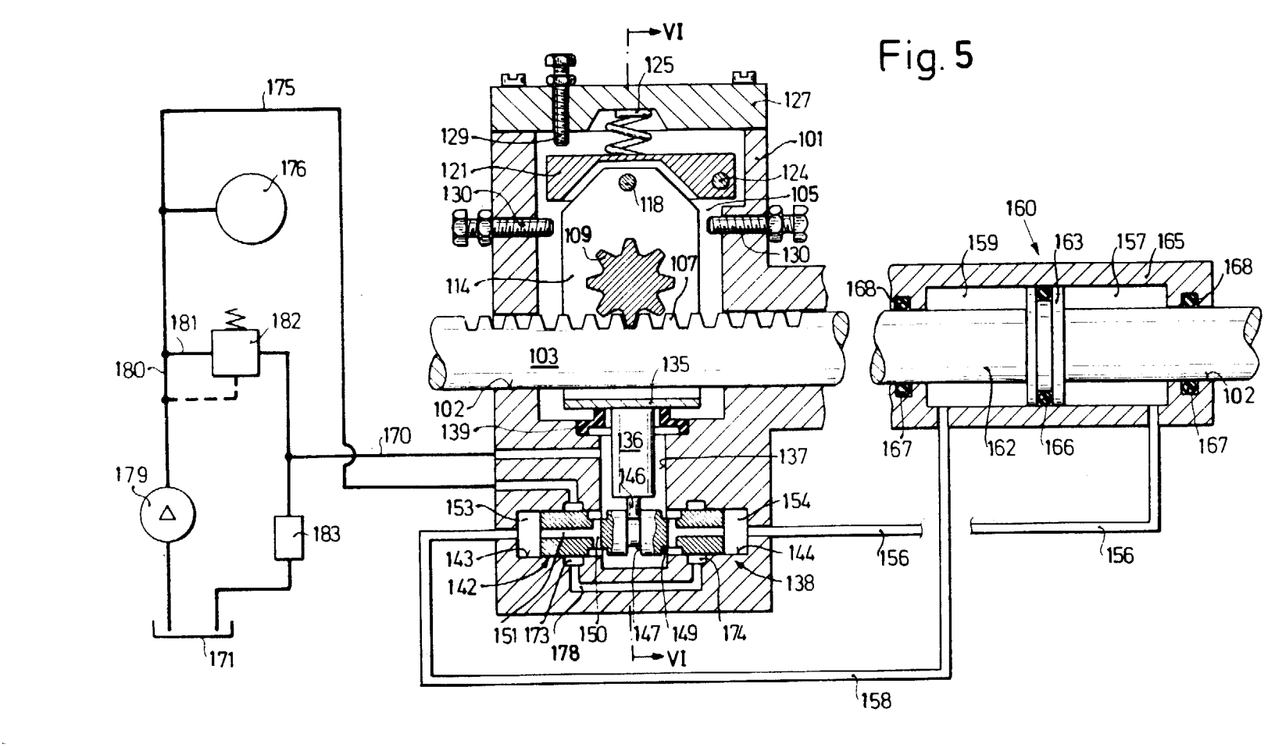
FIG. 5 is a longitudinal section through a third exemplary embodiment of the hydraulic power steering system according to the present invention, some elements being shown schematically.
Figure 6:
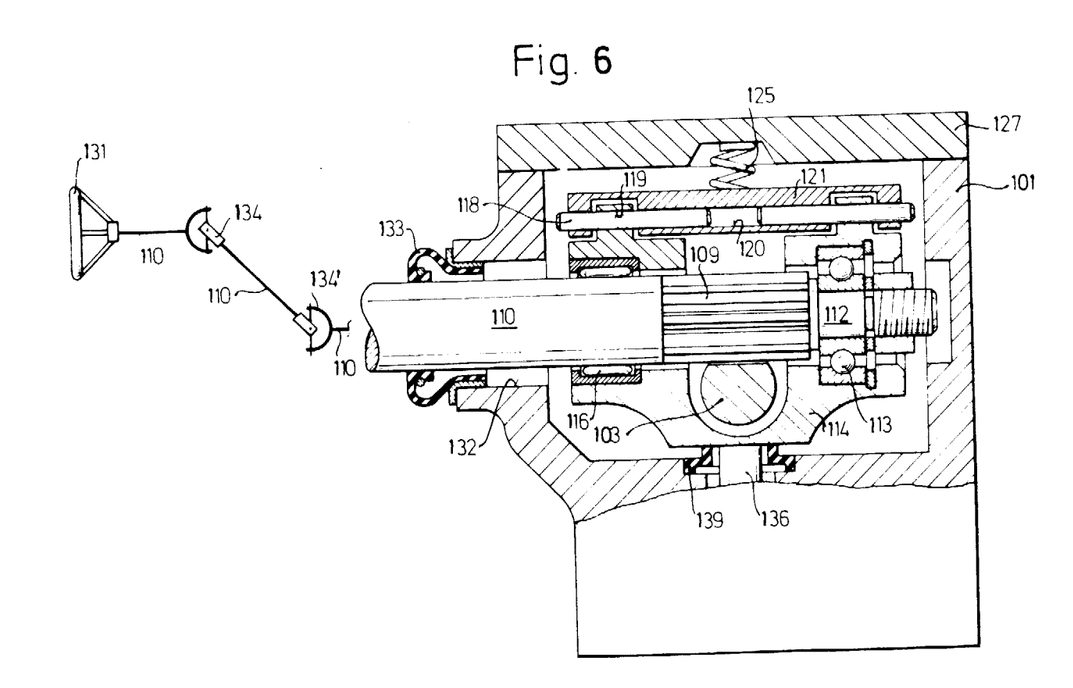
FIG. 6 is a sectional view of the exemplary embodiment of FIG. 5, the section being taken along line VI—VI.

A third embodiment of a hydraulic power steering system, as shown in FIGS. 5 and 6, includes a rack rod 103 connected with the steering gear of a motor vehicle (not shown) guided within a bore 102 of a steering housing box 101. That portion of the rack rod 103 lying within the interior space 105 of the steering housing box 101 is equipped with gear teeth 107 engaged by a pinion 109. The pinion 109 is fixedly attached to a steering shaft 110 extending into the interior of the housing box 105, as shown in FIG. 6. It is advantageous if the pinion 109 is milled directly into an end of the steering shaft 110. The end of the steering shaft 110 carrying the pinion is mounted in a fork 114. The attachment is made, at one end, by a stud 112 engaging a ball bearing 113 inserted in the fork 114 and, at the other end, by being carried in a needle bearing 116 inserted in the fork 114. The ball bearing 113 secures the end of the steering shaft 110 in the steering housing box 101. The fork 114 can be pivoted about a rotational axis member 118 which penetrates the fork 114 at its ends in a bore 119, parallel to the steering shaft 110, and which is firmly inserted in a bore 120 of a rocker beam 121. The rocker beam 121 is pivotable about an axis 124 parallel to the rotational axis member 118 inserted fixedly in the housing box 101 and is loaded perpendicular to the direction of rack rod 103 by a pressure spring 125, compressively positioned between the rocker beam 121 and a cover 127 of the steering housing box 101. The rocker beam 121 is movable in the sense of compressing the pressure spring 125 up to an adjustable stop 129 which can have, for example, the form of a screw screwed into and through the cover 127.

The end of the steering shaft 110 carrying the pinion 109 is consequently pressed onto the rack rod 103 by the rocker beam 121, and, as a consequence of being located in the bearings within the fork 114, it is further capable of motion in the longitudinal direction of rack rod 103 between two adjustable stops 130 screwed into the steering housing box 101.

The steering shaft 110 shares this pendulum motion and it is equipped with a shaft seal 133 which is flexible in the radial direction and which is located at the exit of the steering shaft 110 from the steering housing box 101 at an aperture 132, so that, in spite of the motions of the steering shaft 110, the interior space 105 is tightly sealed with respect to the exterior. In order to assure that the end of the steering shaft 110 can freely follow the motions of the pinion 109 and of the fork 114 between stops 130, it is equipped with a universal joint 134 located between a steering wheel 131 and the steering housing box 101 or with two universal joints, 134, 134', as is provided in most cases for the safety of the operator of motor vehicles in order to reduce the danger of injury during accidents, especially head-on accidents.

An operating pin 136 is provided on a head 135 of the fork 114. The operating pin 136 extends into a cylindrical chamber 137 adjacent to the interior space 105 and serves for operating a control valve assembly 138. An elastic seal 139 slipped over the head 135 seals the cylindrical chamber 137 with respect to the interior space 105. In addition to permitting the pivotal motion of the fork 114, the seal 139 also permits a motion of the fork 114 and the rocker beam 121 perpendicular to the rack rod 103 up to the stop 129.

The control valve assembly 138 consists of a double-acting control valve 142, which is displaceable by the operating pin 136 within two coaxial dead end bores 143 departing to the right and to the left of the cylindrical chamber 137, as viewed in FIG. 5. For this purpose a stud 146 on the operating pin 136 engages an annular groove 147 of the double-acting control valve 142. The double-acting control valve 142 is symmetrically constructed and, adjacent to the middle annular groove 147; it has two annular grooves 149 which are connected, through lateral bore 150 and through axial, dead-end bores 151 terminating in the lateral bores 150 within the double-acting control valve 142, to working chambers 153 and 154 enclosed in the blind bores 143, 144 by the double-acting control valve 142. A pressure medium line 156 leads from a working chamber 154 to a working chamber 157 forming part of a servomotor 160 and a pressure medium line 158 leads from the working chamber 153 to a working chamber 159 also forming part of the servomotor 160.

In the power steering system of FIGS. 5 and 6, a smooth portion of the rack rod 103 serves as a piston rod 162 of the servomotor 160. An annular member serving as a piston 163 is firmly mounted on the piston rod 162 and is slidable, together with the piston rod 162, in a cylinder 165. The piston 163 is equipped with a radial seal 166 and thus divides the cylinder 165 into the two working chambers 157 and 159. The working chambers 157 and 159 are tightly sealed at the point of exit of the piston rod 162 through the longitudinal bore 102 by sealing elements 168 inserted in annular groove 167. The pressure medium lines 156 and 158 terminate respectively at the outermost ends of the cylinder 165.

The power steering system shown in FIGS. 5 and 6 operates as stated below. In the central position of the double-acting control valve 142, the annular grooves 149 communicate with the cylindrical chamber 137 from which a return line 170 leads to a pressure medium storage container 171, and communication is established between the working chambers 157 and 159 of servomotor 160 and the storage container 171 through the lateral bores 150 and the axial bores 151 as well as the pressure medium lines 156 and 158. Thus, the working chambers 157 and 159 of the servomotor 160 are pressure-relieved. When the steering shaft 110 is turned, the fork 114, together with the pinion 109 engaging the gear teeth 107, can turn, for example to the left, until the fork 114 abuts the left stop 130. At this moment, a positive connection is created so that the rack rod 103 can be moved by the pinion 109 in opposition to the wheel forces acting upon it. At the same time, at the beginning of the rotation, the double-acting control valve 142 is displaced to the left by the operating pin 146 and the communication of the left annular groove with the cylindrical chamber 137 is interrupted. At the same time, a communication is also effected between the left annular groove 149 with an annular groove 173 in the wall of the blind bore 143. Terminating in this annular groove 173 is a pressure line 175 coming from a pressurized storage container 176 containing the pressure medium. Also connected to the annular groove 173 is a connecting line 178 leading to a corresponding annular groove 174 disposed symmetrically, with respect to annular groove 173, in the blind bore 144.

As soon as the connection, for example, between the left annular groove 149 and the annular groove 173 is created, the pressure medium can reach the working chamber 159 of the servomotor 160 through the lateral bore 150, the longitudinal bore 151, and the pressure medium line 158. Thus, pressure builds up in working chamber 159 and this pressure is greater than that of the working chamber 157, because the latter is still pressure-relieved with respect to the storage container 171. This results in assisting movement of the rack rod 103. When the longitudinal motion due to rotation of the pinion 109 is terminated, the pinion 109, together with the fork 114, is returned into the central position by the pressure prevailing in working chamber 159 and acting on one side only of the double-acting control valve 142, and in this middle or central position the working chamber 159 is again pressure-relieved through the annular groove 149. In this position, the pressure line 175 is closed, so that a removal of pressure fluid from the pressurized storage container 176 is interrupted.

When the pinion 109 is moved in the opposite direction, by rotating the steering shaft 110 to the right, pressure is admitted into the working chamber 157 of the servomotor 160 and this augments that steering movement. If no pressure medium is available, then the pinion 109, together with the fork 114, are pivoted depending on the rotational direction, until the fork 114 abuts one of the stops 130, after which a positive connection is created between the pinion 109 and the rack rod 103. After this point, a further rotation of the pinion 109 results in moving the rack rod 103 in the appropriate direction. The amount of motion of the pinion 109 from its middle position is made as small as possible in order to hold the lost motion during failure of the power-assist steering system as small as possible and to achieve a high response accuracy.

The supply of pressure medium to the pressurized storage container 176 is effected by a pump 179 which pumps the pressure medium from the storage container 171 through a line 180 to the pressurized storage container 176. Between the storage container 176 and the pump 179, a pressure line 181 branches off from the line 180, and terminates in the return line 170 coming from the control valve installation 138. A pressure-limiting valve 182 is positioned in the line 181. Advantageously, a filter 183 is built into the return line 170.

The pinion 109 on the steering shaft 110 (FIG. 5) can also be pivoted vertically with respect to the rack rod 103 because the fork 114, which carries the end of the steering shaft 110, is connected to the rocker beam 121 and it can be displaced in opposition to the force of the compression spring spring 125 up to the adjustable stop 129. As a result of the action of spring 125, the pinion 109 is pressed into the gear teeth 107 of the rack rod 103 and a play-free engagement is achieved as long as the force components perpendicular to the rack rod 103 of the steering wheel act on the rack rod 103 and those resulting from the shape of the gear teeth, are smaller than the force of the spring 125. If these force components exceed the force of the spring 125, however, then the pinion 109 yields, in the sense of enlarging the play, until the rocker beam 121 abuts the stop 129. In this way, it is possible to achieve a substantially play-free engagement of the pinion 109 in the rack rod 103 over the entire length of the gear teeth 107, with small steering forces, in spite of substantial material removal through wear in the central portions of the gear teeth 107. In particular, an exact steering is possible, for example, in the domain of fast vehicle motion, in which wheel forces or steering forces are considerably reduced. Compression spring 125 can be designed to be adjustable, so that the pressing force can be exactly metered. Furthermore, it is possible to re-adjust the maximum play at the stop 129 when the play has changed due to wear.

Of course, it is possible to utilize another customary control valve installation in the system, according to FIGS. 5 and 6. The carriage of the rotational axis member 118 and of axis member 124 in sleeve bearings, as shown in this exemplary embodiment can, of course, also occur in roller bearings in order to reduce friction as much as possible. It is also possible to dispose a compression spring between the steering housing box 101 and the rocker beam 121 instead of the pressure spring 125.

Figure 7:
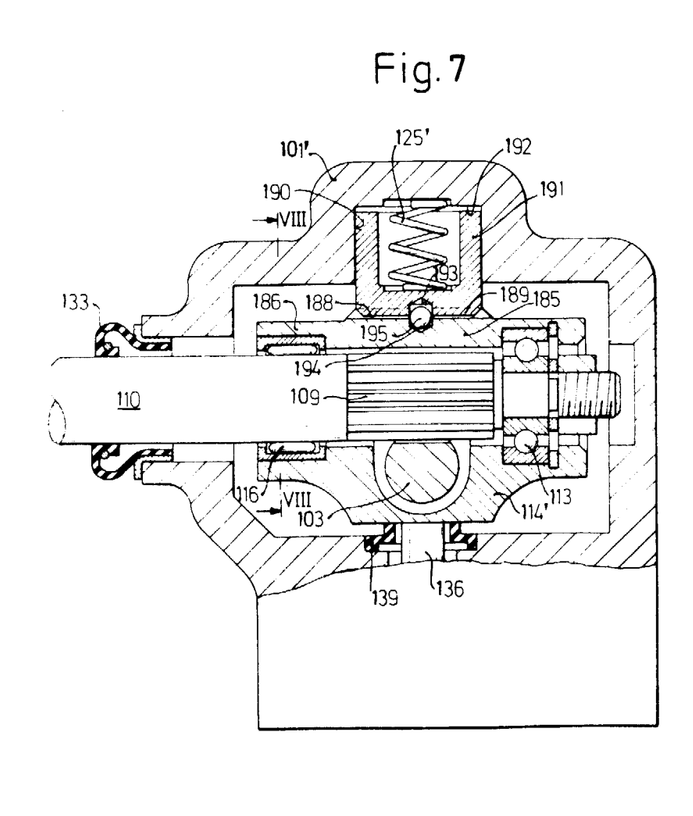
FIG. 7 is a partial section through a fourth exemplary embodiment of the hydraulic power steering system according to the present invention.
Figure 8:
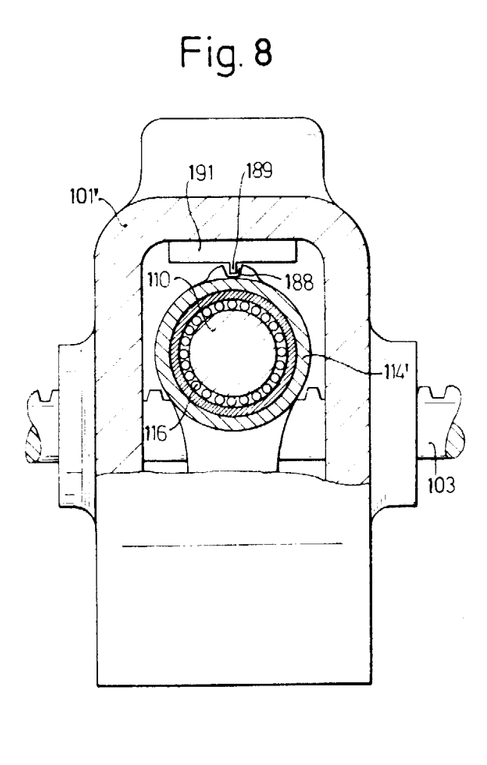
FIG. 8 is a partial section through the exemplary embodiment of FIG. 7, the section being taken along the line VIII—VIII.

The exemplary embodiment of a hydraulic steering system as shown in FIGS. 7 and 8 is essentially similarly constructed as the exemplary embodiment illustrated in FIGS. 5 and 6. The essential difference between these two embodiments is in the design of and the kind of bearing used for the fork 114 (FIGS. 5 and 6) and the fork 114' (FIGS. 7 and 8). As shown in FIGS. 7 and 8, the pinion 109 on the end of the steering shaft 110 is carried in the fork-shaped body 114', hereafter called a fork, which is designed somewhat similar to the fork 114 of FIG. 6. However, the fork 114' is equipped with a connecting bridge 185 between the ends 186 of the fork 114'. A longitudinal groove 188 is cut into the top of the connecting bridge 185 parallel to steering shaft 110, as seen in FIG. 8. Engaging the longitudinal groove 188 is a rack bar 189 machined into the outside of the bottom of a dome-shaped element 191. The rack bar 189 is guided in a cylindrical space 190 of a steering housing box 101'. Disposed between the inside of the bottom of the dome-shaped element 191 and the steering housing box 101' is a compression spring 125' against the force of which the dome-shaped element 191 is slidable up to a fixed stop 192. In order to absorb forces occurring in the longitudinal direction of the longitudinal groove 188 or of the rack bar 189, two blind bores 193 and 194 are provided opposite one another in the connecting bridge 185 and in the bottom of the dome-shaped element 191 respectively. A sphere 195 is fitted in the blind bores 193 and 194 in such a way that the central plane of the sphere 195 coincides with a line connecting the tips of the gear teeth in rack bar 189.

The exemplary embodiment illustrated in FIGS. 7 and 8 does not include an axis member 118, such as used in the embodiment of FIGS. 5 and 6. The disposition is more space-saving and friction is reduced in the pivotal point. The use of the dome-shaped element 191 serves to define, at one and the same time, in a very advantageous fashion, the rotational axis, the stop 192 and a location for the pressure spring 125' for pressing the pinion 109 to the rack rod 103.

The embodiments described above and illustrated in FIGS. 5–8 achieve a simply acting system for transmitting longitudinal steering motion and direction of steering to the control valve assembly. These embodiments also achieve an exactly acting play equalization at the place of engagement of the pinion 109 in the rack rod 103. The rack rod 103 does not have to be radially displaced, which makes possible a simplified sealing of the associated servomotor.

It is to be appreciated that the illustrative embodiments of a power steering system according to the present invention are set out by way of example, not of limitation. Numerous variants and other embodiments are possible without departing from the spirit and scope of the invention, the scope being defined in the appended claims.

That which is claimed is:

1. A hydraulic power steering system comprising, in combination:
 a. a rack rod;
 b. a pinion disposed on an end of a steering shaft;
 c. servomotor means including a double acting piston, said servomotor means being coupled to said rack rod for assisting steering motion thereof;
 d. means for supplying hydraulic fluid to said servomotor means;
 e. control valve assembly means;
 f. motion transmitter means for transmitting rotation motion and rotational direction of said steering shaft to said valve assembly means, said motion transmitter means including:
  1. means defining a substantially fixed axis of rotation;
  2. lever means pivotable about said fixed axis of rotation; and
  3. means for connecting said lever means to said control valve assembly;
 g. steering housing means, said lever means, said end of said steering shaft having said pinion thereon and said control valve assembly means all being positioned within said housing means and said rack rod being guidable through said housing means;
 h. aperture means in said housing means, said end of said steering shaft being mounted on said lever means and said lever means exiting from said steering housing means without guidance via said aperture means;
 i. resilient shaft seal means for sealing said aperture means with respect to said steering housing means in radial direction;
 j. bearing means at an entrance into said steering housing means; and
 k. a coupling member and at least two universal joints, said steering shaft being carried in said bearing means at said entrance into said steering housing means, being connected to said steering shaft end carrying said pinion, and being radially borne in said lever means by said coupling member and said at least two universal joints.

2. A hydraulic power steering system according to claim 1, including a spring means and means defining a rotational axis for said lever means, said spring means being positioned adjacent said lever means for displacing said rotational axis in the sense of pressing said pinion onto said rack rod by the force of said spring means.

3. A hydraulic power steering system according to claim 2, including adjustable stop means positioned in the vicinity of said means defining said rotational axis, and wherein said means defining said rotational axis is loaded by said spring means perpendicularly with respect to the longitudinal axis of said pinion and to said rack rod, said means defining said rotational axis being movable against the pressure of said spring up to said adjustable stop means.

4. A hydraulic power steering system according to claim 3, including a rocker beam, said means defining said rotational axis being carried on said rocker beam, said rocker beam being pivotable about a fixed axis, parallel to said rotational axis.

5. A hydraulic power steering system according to claim 3, including a rack bar located on a member and a stop, and wherein said means defining said rotational axis is said rack bar, said member is guided in said steering housing means and is movable up to said stop against the force of said spring, and wherein said rack bar engages a corresponding longitudinal groove of said lever means.

6. A hydraulic power steering system according to claim 5, wherein said member is made in the shape of a cup and said rack bar is positioned on its bottom exterior.

7. A hydraulic power steering system according to claim 6, including a coupling member and wherein said rack bar and said longitudinal groove each contain respectively an oppositely lying blind hole for receiving said coupling member which serves to absorb transverse forces.

8. A hydraulic power steering system according to claim 7, wherein said coupling member has a spherical shape.

* * * * *